(12) United States Patent
Rudi et al.

(10) Patent No.: US 7,172,149 B1
(45) Date of Patent: Feb. 6, 2007

(54) LONG TAPE PATH GUIDE SYSTEM AND METHOD

(75) Inventors: Guttorm Rudi, Fjellhamar (NO); Ladislav Rubas, Tranby (NO); Jørn Raastad, Oslo (NO)

(73) Assignee: Tandberg Storage ASA, Oslo (NO)

( * ) Notice: Subject to any disclaimer, the term of this patent is extended or adjusted under 35 U.S.C. 154(b) by 0 days.

(21) Appl. No.: 11/209,121

(22) Filed: Aug. 22, 2005

(51) Int. Cl.
*G03B 1/58* (2006.01)

(52) U.S. Cl. ................................ 242/332.4; 242/532.5
(58) Field of Classification Search ................ 242/332, 242/332.1, 332.4, 348.2, 532.5; 360/95, 360/96, 132

See application file for complete search history.

(56) References Cited

U.S. PATENT DOCUMENTS

| | | | |
|---|---|---|---|
| 3,800,314 A * | 3/1974 | Sato | 360/95 |
| 4,335,858 A * | 6/1982 | Cranna | 242/332.4 |
| 4,926,278 A | 5/1990 | Schoenmakers | |
| 5,058,820 A * | 10/1991 | Ito et al. | 242/332 |
| 5,501,386 A | 3/1996 | Kobayashi | |
| 5,581,419 A | 12/1996 | Kobayashi | 360/95 |
| 6,142,402 A * | 11/2000 | Reilly | 242/332.8 |
| 6,257,514 B1 * | 7/2001 | Morris et al. | 242/332.4 |
| 6,427,934 B1 * | 8/2002 | Saliba et al. | 242/332.4 |
| 6,588,694 B1 * | 7/2003 | Wilkerson | 242/332.4 |
| 6,889,927 B2 * | 5/2005 | Gavit et al. | 242/332.4 |
| 2004/0222327 A1* | 11/2004 | Hanscom | 242/332 |

* cited by examiner

*Primary Examiner*—William A. Rivera
(74) *Attorney, Agent, or Firm*—Schiff Hardin LLP

(57) ABSTRACT

In a tape system and method for guiding a tape from a tape reel to a read/write tape head and then to a take-up reel, the tape is guided along a tape path such that the path surrounds the take-up reel and then begins winding on the take-up reel. With such a long tape guide path, less pressure is required on an edge of the tape for positioning the tape at the tape head.

26 Claims, 3 Drawing Sheets

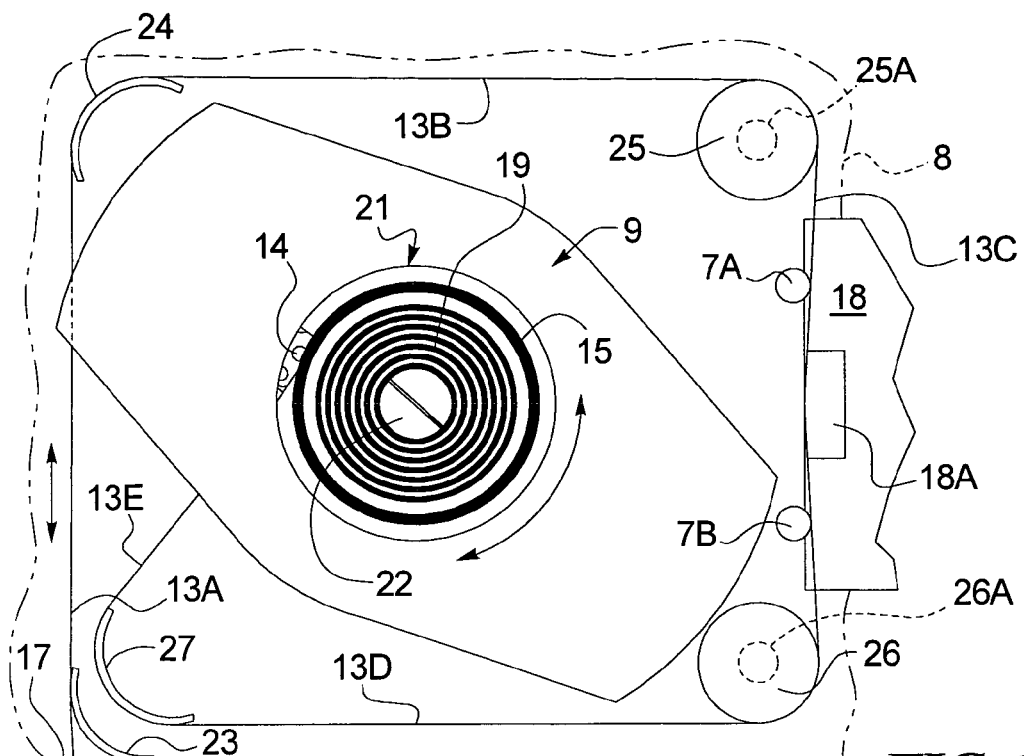
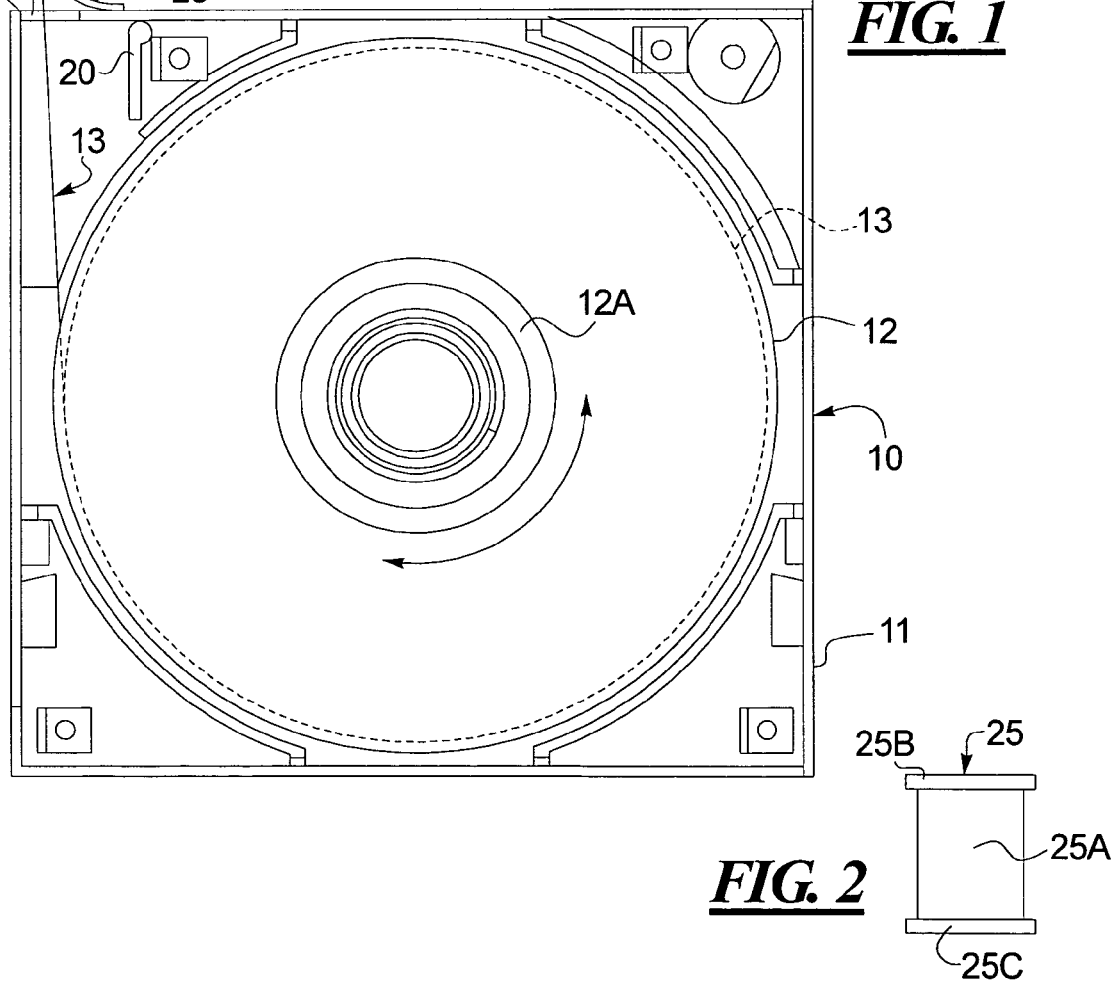
*FIG. 1*
*FIG. 2*

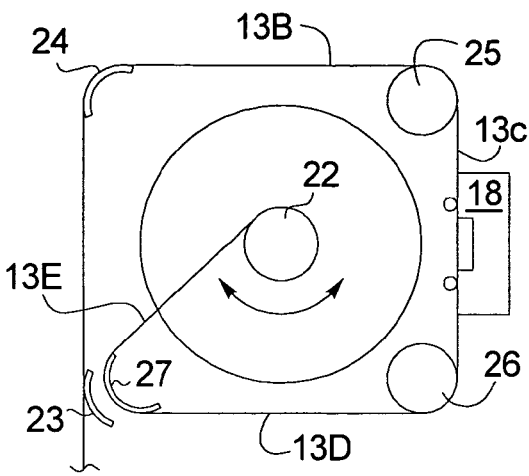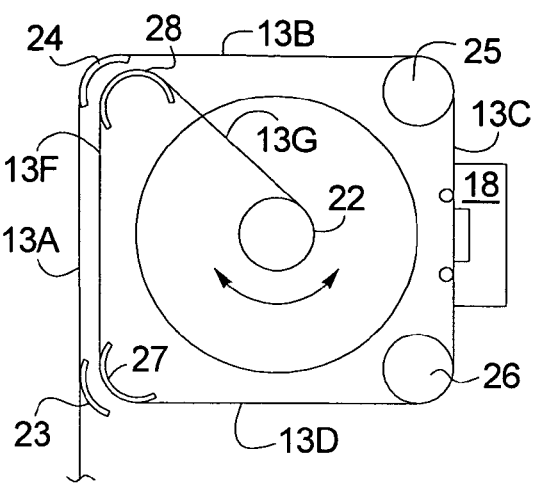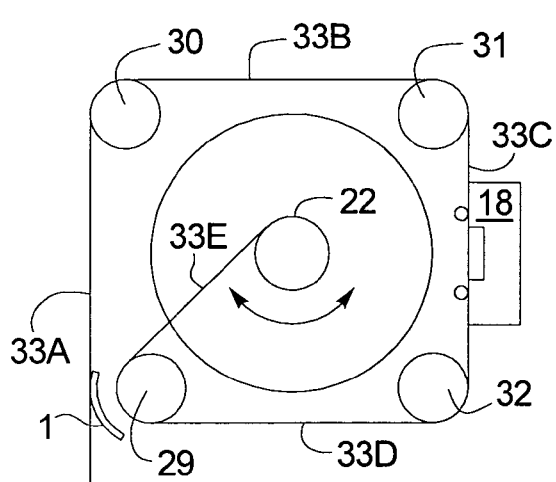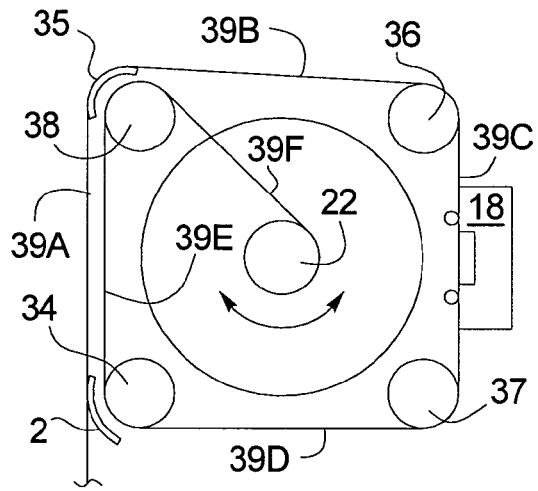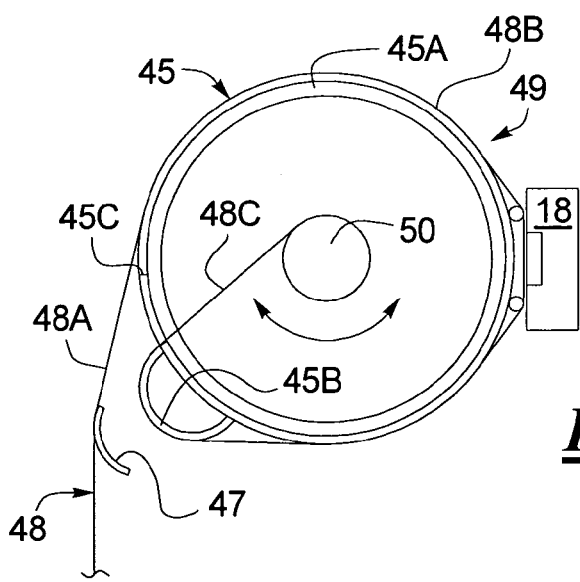

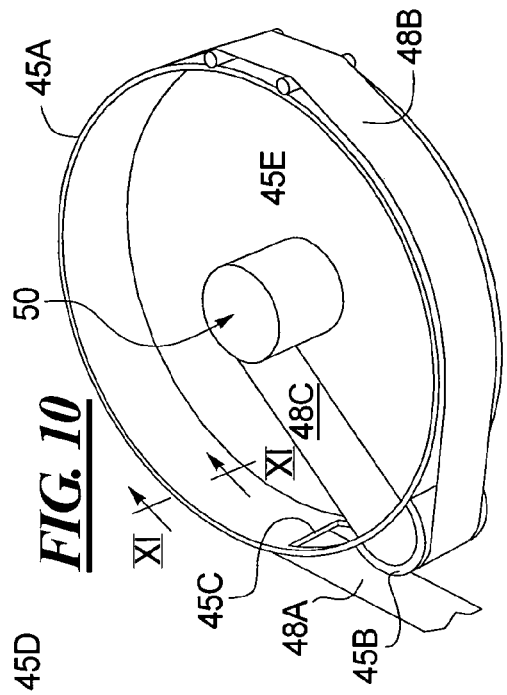
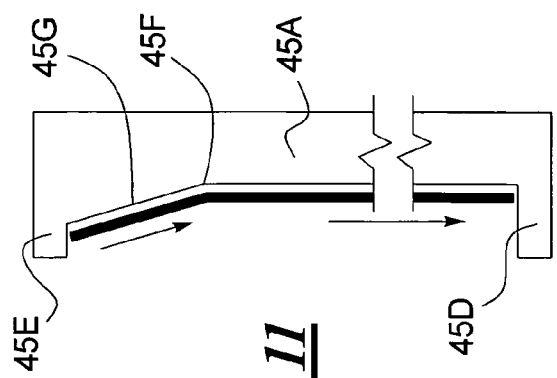
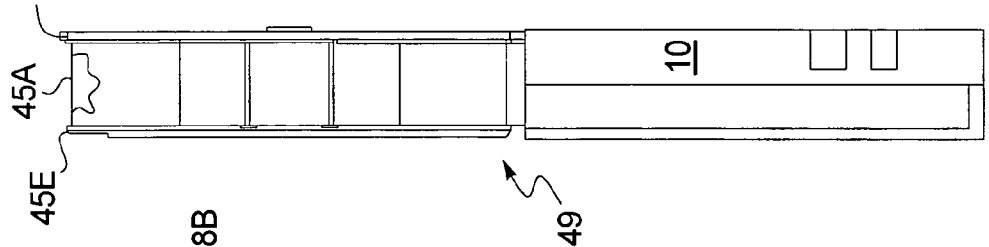
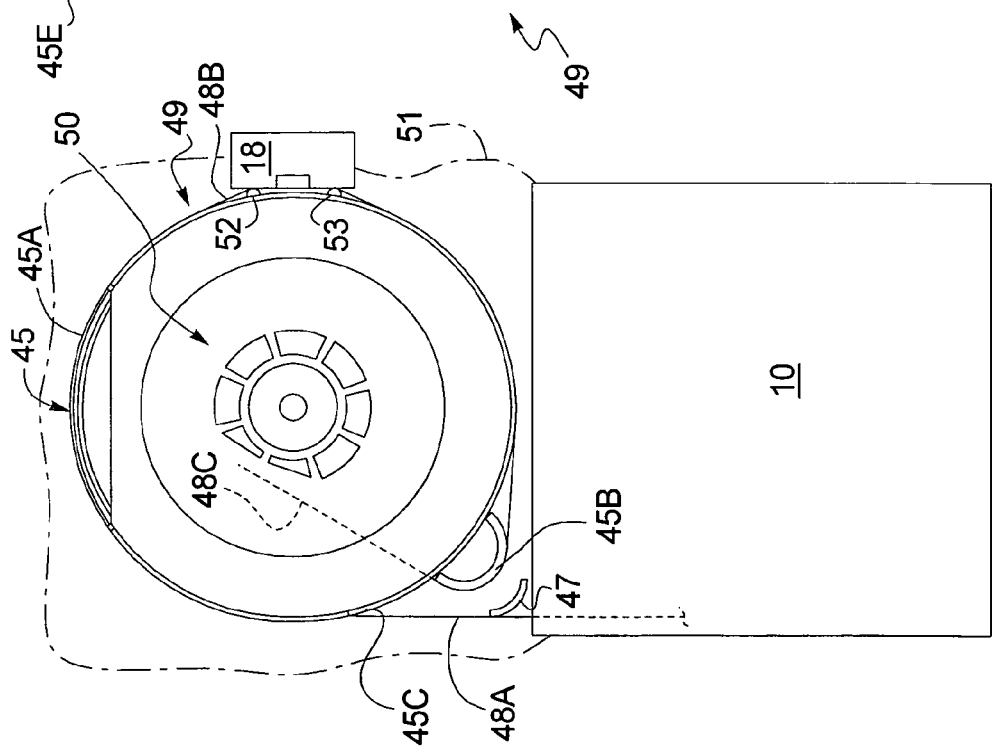

LONG TAPE PATH GUIDE SYSTEM AND METHOD

BACKGROUND

When feeding tape from a tape cartridge to a read/write tape head assembly and thereafter to a tape take-up unit, and also in the reverse direction, it is known to provide a tape guide such as a static tape guide or a roller type tape guide having at least one alignment edge in close proximity to the head assembly. Thus the tape is in a stable position in a transverse direction relative to its longitudinal direction of travel as it passes over the tape head. It is important to keep this transverse (lateral) movement as low as possible for correct reading of information by the read/write head. A disadvantage of such an alignment system, however, is that excessive forces are placed on at least one edge of the tape by the at least one alignment edge of a static or roller type tape guide.

SUMMARY

It is an object to stabilize tape in preparation for moving across a head assembly to prevent transverse (lateral) movement of the tape, but minimizing edge wear of the tape.

In a tape system and method for guiding a tape from a tape reel to a read/write tape head and then to a take-up reel, the tape is guided along a tape path such that the path surrounds the take-up reel and then is wound on the take-up reel. With such a long tape guide path, less pressure is required on an edge of the tape for positioning the tape at the tape head.

BRIEF DESCRIPTION OF THE DRAWINGS

FIG. 1 is a plan view of a tape cartridge and a tape take-up unit having a long tape path guide system at the tape take-up unit;

FIG. 2 is a side view of at least one of the tape rollers adjacent the tape head assembly in FIG. 1;

FIG. 3 is a schematic top view of a long tape path guide system in the tape take-up unit of FIG. 1;

FIG. 4 is a schematic top view of a second embodiment of a long tape path guide system;

FIG. 5 is a schematic top view of a third embodiment of a long tape path guide system;

FIG. 6 is a schematic top view of a fourth embodiment of a long tape path guide system;

FIG. 7 is a schematic top view of a sixth embodiment of a long tape path guide system;

FIG. 8 is a plan view of a tape cartridge and tape take-up unit having the sixth embodiment long tape path guide system of FIG. 7;

FIG. 9 is a side view of the tape cartridge and tape take-up unit of FIG. 8;

FIG. 10 is a perspective view of the long tape path guide system employed in FIG. 8; and FIG. 11 is a cut-away view taken along line XII—XII of FIG. 10 showing a cross-sectional profile of portions of a circular portion of the long tape path guide system of FIG. 10.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

With the embodiments described hereafter, a long tape path is created with the distance from a tape exit of a tape cartridge to a read/write head is very long. This keeps the tape lateral (transverse) movement as low as possible as it crosses across the tape head assembly as described hereafter. Also if a tape guide flange or edge is employed, before, after, or at both sides of the head assembly to maintain a stable lateral (transverse) position of the tape as it crosses the head assembly, pressure on the tape edge is minimized, which minimizes tape wear. With the long tape path guide system provided, the radial and/or axial run-out of the outer diameter of the tape cartridge which causes tape lateral (transverse) movement is minimized at the tape head assembly. By providing a long distance from the tape cartridge to the head, less force is needed on the tape edge in order to reduce the undesirable lateral movement.

A long tape path is also provided between a drive take-up reel of the tape and the tape head assembly when the tape is moving in the opposite direction from the take-up reel back to the cartridge. Typically the lateral movement in this reverse direction is somewhat less since the take-up reel is mounted directly to the drive motor shaft, whereas the tape cartridge tape reel is coupled to the drive motor by a toothed rim drive chuck, for example.

As described hereafter, the long tape path guide system may employ different combinations of static and roller tape guides, or a ring-shaped static tape guide.

The long tape path guide system provided increases the tape path length from the tape cartridge to a guide element which defines the lateral position of the tape as it crosses the head. As described above, the same is true in the reverse direction where the length of the tape path from the take-up reel to the head increased.

With the ring-shaped static tape guide of one embodiment, the force for stabilizing the tape is distributed over a longer length of tape such that stress on the tape when positioning the tape at its desired lateral position is lowered.

Very little additional space is required for the long tape path guide system since it closely surrounds the drive take-up reel in the tape take-up unit.

As shown in FIG. 1, a tape take-up unit 9 has a drive 21 comprising a drive take-up reel 22. On this take-up reel, a coil spring 19 is provided which connects to a leader tape 15 having a drive leader block 14 at one end for connecting to tape 13 from a tape cartridge 10. A head assembly 18, having for example a read/write tape head 18A, is provided between two positioning pins 7A, 7B which press the tape against the tape head 18A. The tape take-up unit 9 is mounted, for example, by use of a support plate 8 shown in dashed lines.

The tape cartridge 10 comprises a housing 11 with a cartridge tape reel 12 and a hub 12A. Tape 13 is initially wound on this reel.

Tape 13 exits from the tape cartridge 10 at an access window 17 where it encounters a first static curved tape guide 23. A tape path section 13A then leads to a second curved static guide 24 and thereafter a tape path section 13B is provided to a first tape roller 25 with axle 25A. The first tape roller 25 preferably has a round circular central support portion 25A and upper and lower guide flanges 25B, 25C as shown in FIG. 2. At the upper guide flange 25B there may be provided a slanted portion similar to a slanted portion described hereafter with respect to FIG. 12.

Thereafter, tape path section 13C is positioned across the tape head 18A and pressed by guide pins 7A and 7B against the tape head 18A. Thereafter the tape passes around a second tape roller 26 with axle 26A which may also have upper and lower guide flanges or edges as shown in FIG. 2. Thereafter the tape is guided along tape path section 13D and passes around a third curved static tape guide 27. Thereafter the tape travels at tape path section 13E and attaches to the aforementioned cartridge leader block 16 and thus to the leader tape 15.

When the tape travels in the reverse direction, it unwinds from the tape take-up reel 22 and rewinds back onto the hub 12A of the tape cartridge reel 12 in the tape cartridge 10.

The long tape path guide system of FIG. 1 guides the tape in a path around the take-up reel of approximately 360°.

FIGS. 3–8 show some of the different embodiments of the long tape path guide system. FIG. 3 shows the first embodiment illustrated in FIG. 1. Here the last tape path segment 13E passes from the third curved static guide 27 to the take-up reel 22.

In the second embodiment of FIG. 4 the long tape path guide system comprises a first curved static tape guide 23, a second curved static tape guide 24, a first roller 25, a second roller 26, a third curved static tape guide 27, and a fourth curved static tape guide 28 with additional tape path sections 13E and 13G, as compared to FIG. 3.

In the third embodiment of FIG. 5, the long tape path guide system employs a curved static tape guide 1, first and second tape rollers 31 and 32, and additionally a third tape roller 29 and a fourth tape roller 30 defining tape path sections 33A, 33B, 33C, 33D, and 33E.

In the fourth embodiment of FIG. 6, a first curved static tape guide 2, and first and second tape rollers 36 and 37 are provided, along with an additional third tape roller 34 and a fourth tape roller 38. Also, a second curved static tape guide 35 is provided so that tape path sections 39A, 39B, 39C, 39D, 39E, and 39F are defined.

In the fifth embodiment of FIG. 7, a circular static tape guide 45 and curved static tape guide 47 are provided for the long tape path guide system. The circular static tape guide 45 comprises a circular guide surface 45A, a curved guide portion 45B, a tape opening 45C, and lower and upper tape guide flanges or edges 45D and 45E (see also FIGS. 8–11 described hereafter).

As shown in FIG. 7, after curved static tape guide 47 the tape 48 traverses tape path sections 48A, 48B, and 48C as it winds on the take-up reel 50.

FIGS. 8–11 show in greater detail the circular static long tape path guide system of the sixth embodiment of FIG. 7.

As shown in FIG. 8, the tape cartridge 10 is positioned adjacent to a support plate 51 on which the curved static tape guide 47 and circular static tape guide 45 are mounted. Guide pins 52 and 53 are provided for aid in positioning the tape adjacent the head assembly 18.

As shown in FIG. 9, the lower guide flange 45D and the upper guide flange 45E are positioned below and above the circular guide surface 45A.

FIG. 10 shows the tape opening 45C where the tape enters inside of the circular guide surface 45A at the curved guide portion 45B.

FIG. 11 is a fragmented cross-sectional view along section line XII—XII in FIG. 10 showing the upper corner and lower corner at the lower guide flange 45D and upper guide flange 45E. An angled section 45G is provided at a top portion of the circular guide surface 45A of the circular static guide 45 causing a downward pressure on the tape which causes it to abut at its lower edge at the corner between the circular guide surface 45A and the lower guide flange 45D. The length and angled section 45G after transition point 45F is selected so that wear pressure on the lower edge of the tape is not excessive but the tape is still successfully positioned just prior to entry and passage across the head assembly 18.

Preferably the long tape path guide system has a five and one-quarter inch form factor footprint. The footprint area is approximately 146 mm×208 mm. The height of the system is approximately 41.5 mm.

While preferred embodiments have been illustrated and described in detail in the drawings and foregoing description, the same are to be considered as illustrative and not restrictive in character, it being understood that only preferred embodiments have been shown and described and that all changes and modifications that come within the spirit of the invention both now or in the future are desired to be protected.

We claim:

1. A tape system for reading or writing information from or to a tape, comprising:
   a tape cartridge having a reel of tape therein and a tape exit;
   a read/write tape head;
   a tape take-up unit having a take-up reel; and
   a long tape path guide system of the tape take-up unit which guides the tape along a path from said exit of said tape cartridge which surrounds at least 360° of the take-up reel before it is wound on the take-up reel, and said guide system guiding said tape to said tape head, said tape head being located at an intermediate point along the long tape guide path between the cartridge exit and winding of the tape onto the take-up reel.

2. A system of claim 1 wherein the long tape path guide system comprises in sequence from the exit of the tape cartridge a fourth tape roller, a first tape roller, a second tape roller with the head assembly between the first and second tape rollers, and a third tape roller.

3. A system of claim 1 wherein a footprint area of the system is approximately 146 mm×208 mm.

4. A system of claim 3 wherein a height of the system is approximately 41.5 mm.

5. A system of claim 1 wherein the long tape path guide system comprises a circular static guide providing a tape path after the exit of the tape cartridge with a circular guide surface which terminates allowing the tape to bend around said termination toward said take-up reel.

6. A system of claim 5 wherein the curved static tape guide has at an end of said circular guide surface a curved guide portion followed by a tape opening, said curved static tape guide forming a one piece circular structure.

7. A system of claim 5 wherein a curved static tape guide is positioned between said circular static tape guide and said tape cartridge exit.

8. A system of claim 1 wherein the long tape path guide system also has two positioning pins which locate the tape in contact with the read/write tape head.

9. A tape system for reading or writing information from or to a tape, comprising:
   a tape cartridge having a reel of tape therein and a tape exit;
   a read/write tape head;
   a tape take-up unit having a take-up reel;

a long tape path guide system of the tape take-up unit which guides the tape along a path from said exit of said tape cartridge which surrounds at least approximately 360° of the take-up reel before it is wound on the take-up reel, and said guide system guiding said tape to said tape head, said tape head being located at an intermediate point along the long tape guide path between the cartridge exit and winding of the tape onto the take-up reel; and the tape guide path comprising in sequence from the exit of the tape cartridge a first curved static tape guide, a second curved static tape guide, a first tape roller, a second tape roller with the tape head substantially between the first and second tape rollers, and then a third curved static tape guide.

10. A tape system for reading or writing information from or to a tape, comprising:

a tape cartridge having a reel of tape therein and a tape exit;

a read/write tape head;

a tape take-up unit having a take-up reel;

a long tape path guide system of the tape take-up unit which guides the tape along a path from said exit of said tape cartridge which surrounds at least approximately 360° of the take-up reel before it is wound on the take-up reel, and said guide system guiding said tape to said tape head, said tape head being located at an intermediate point along the long tape guide path between the cartridge exit and winding of the tape onto the take-up reel; and the long path tape guide system comprising in sequence from the tape cartridge exit a first curved static tape guide, a second curved static tape guide, a first tape roller, a second tape roller with the head assembly substantially between the first and second tape rollers, a third static curved static tape guide, and a fourth static tape guide.

11. A tape system for reading or writing information from or to a tape, comprising:

a tape cartridge having a reel of tape therein and a tape exit;

a read/write tape head;

a tape take-up unit having a take-up reel;

a long tape path guide system of the tape take-up unit which guides the tape along a path from said exit of said tape cartridge which surrounds at least approximately 360° of the take-up reel before it is wound on the take-up reel, and said guide system guiding said tape to said tape head, said tape head being located at an intermediate point along the long tape guide path between the cartridge exit and winding of the tape onto the take-up reel; and the long tape path guide system comprising in sequence from the exit of the tape cartridge a first curved static tape guide, a first roller, a second roller with the head assembly between the first and second rollers, a third tape roller, and a fourth tape roller.

12. A tape system for reading or writing information from or to a tape, comprising:

a tape cartridge having a reel of tape therein and a tape exit;

a read/write tape head;

a tape take-up unit having a take-up reel;

a long tape path guide system of the tape take-up unit which guides the tape along a path from said exit of said tape cartridge which surrounds at least approximately 360° of the take-up reel before it is wound on the take-up reel, and said guide system guiding said tape to said tape head, said tape head being located at an intermediate point along the long tape guide path between the cartridge exit and winding of the tape onto the take-up reel; and the long tape path guide system having at least one tape guide edge receiving one edge of the tape and an angled section opposite the guide edge which pushes the tape toward the tape guide edge.

13. A system of claim 12 wherein another tape guide edge is provided at an end of said angled section.

14. A tape system for reading or writing information from or to a tape, comprising:

a tape cartridge having a reel of tape therein and a tape exit;

a read/write tape head;

a tape take-up unit having a take-up reel;

a long tape path guide system of the tape take-up unit which guides the tape along a path from said exit of said tape cartridge which surrounds at least approximately 360° of the take-up reel before it is wound on the take-up reel, and said guide system guiding said tape to said tape head, said tape head being located at an intermediate point along the long tape guide path between the cartridge exit and winding of the tape onto the take-up reel; and first and second tape rollers being provided with the tape head positioned therebetween, and wherein at least one curved static tape guide is also provided.

15. A system of claim 14 wherein at least one of the first and second tape rollers has a tape guide edge which abuts against one edge of the tape, and opposite the tape guide edge an angled section which causes a bending of the tape which causes the tape edge to move against the tape guide edge.

16. A tape system for reading or writing information from or to a tape, comprising:

a tape reel with tape thereon;

a read/write tape head;

a tape take-up reel; and a long tape guide system which guides the tape from said tape reel in a continuously circular path surrounding at least approximately 360° of the take-up reel, said guide system guiding said tape to a location next to said tape head on the long tape guide path.

17. A method for guiding a tape from an exit of a tape cartridge to a read/write tape head and then to a take-up reel, comprising the steps of:

guiding the tape along a tape path so that the path surrounds the take-up reel by at least 360° before it begins winding on the take-up reel.

18. A method of claim 17 including the step of guiding the tape along a tape path which is rectangular prior to entry onto the tape take-up reel.

19. A method of claim 17 including the step of providing the tape path as a circular tape path and guiding the tape around a circle.

20. A method of claim 17 including the step of providing a circular static tape guide for providing a circular tape path surrounding at least 360° of the take-up reel.

21. A method of claim 17 including the step of providing a curved guide portion at an end of the circular path prior to winding of the tape onto the take-up reel.

22. A method for guiding a tape from an exit of a tape cartridge to a read/write tape head and then to a take-up reel, comprising the steps of:

guiding the tape along a tape path so that the path surrounds the take-up reel by at least approximately 360° before it begins winding on the take-up reel; and providing on the tape path a tape guide edge with an angled section opposite a tape guide edge which causes the tape to move towards the tape guide edge.

23. A method for guiding a tape from an exit of a tape cartridge to a read/write tape head and then to a take-up reel, comprising the steps of:

guiding the tape along a tape path so that the path surrounds the take-up reel by at least approximately 360° before it begins winding on the take-up reel;

providing on the tape a tape guide edge with an angled section opposite a tape guide edge which causes the tape to move towards the tape guide edge; and said tape guide being positioned before an entrance region to said tape head.

24. A method for guiding a tape from an exit of a tape cartridge to a read/write tape head and then to a take-up reel, comprising the steps of:

guiding the tape along a tape path so that the path surrounds the take-up reel by at least approximately 360° before it begins winding on the take-up reel;

providing on the tape path a tape guide edge with an angled section opposite a tape guide edge which causes the tape to move towards the tape guide edge; and providing a tape guide edge both before and after the tape head.

25. A method for guiding a tape from an exit of a tape cartridge to a read/write tape head and then to a take-up reel, comprising the steps of:

guiding the tape along a tape path so that the path surrounds the take-up reel by at least approximately 360° before it begins winding on the take-up reel; and providing at least two tape rollers with the head assembly positioned between the two tape rollers and also a static curved tape guide.

26. A method for guiding a tape from a tape reel to a read/write tape head, and then to a take-up reel, comprising the steps of:

guiding the tape along a continuously circular tape path such that the tape path surrounds at least approximately 360° of the take-up reel before it is wound on the take-up reel.

* * * * *